A. C. BRANTINGHAM.
SIFTER CONTROL DEVICE.
APPLICATION FILED NOV. 20, 1907.
946,716.
Patented Jan. 18, 1910.
3 SHEETS—SHEET 2.
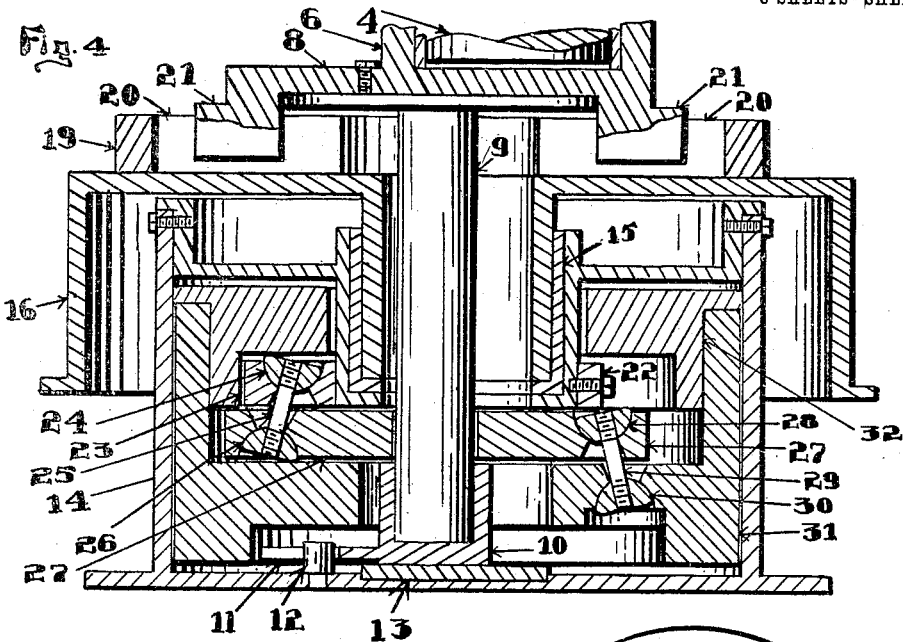
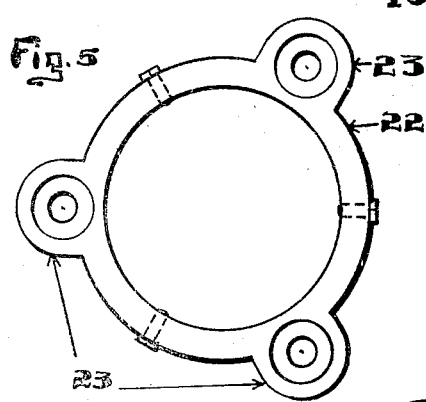
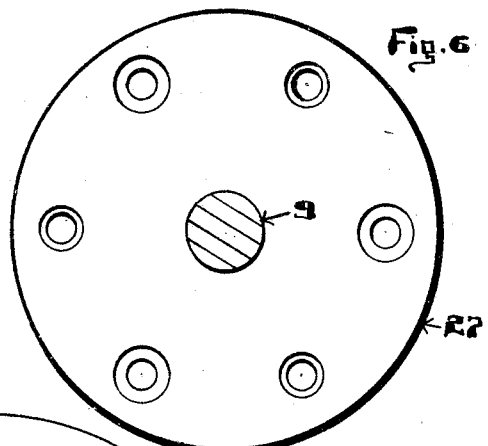
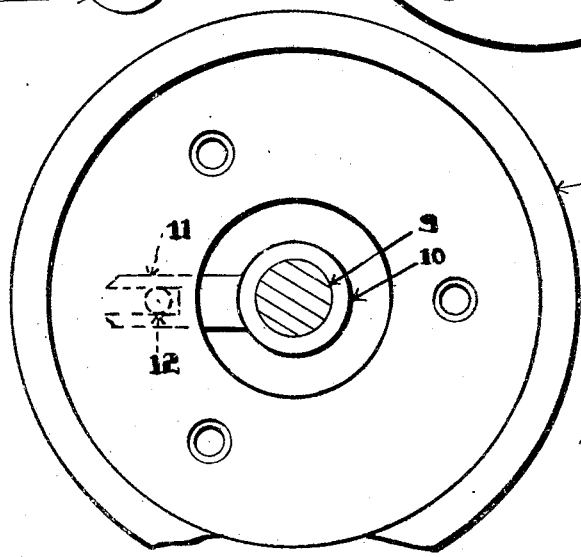
WITNESSES
Hazel Kirk
M E Kirk
Allen C Brantingham
INVENTOR
by Geo E Kirk
ATTORNEY

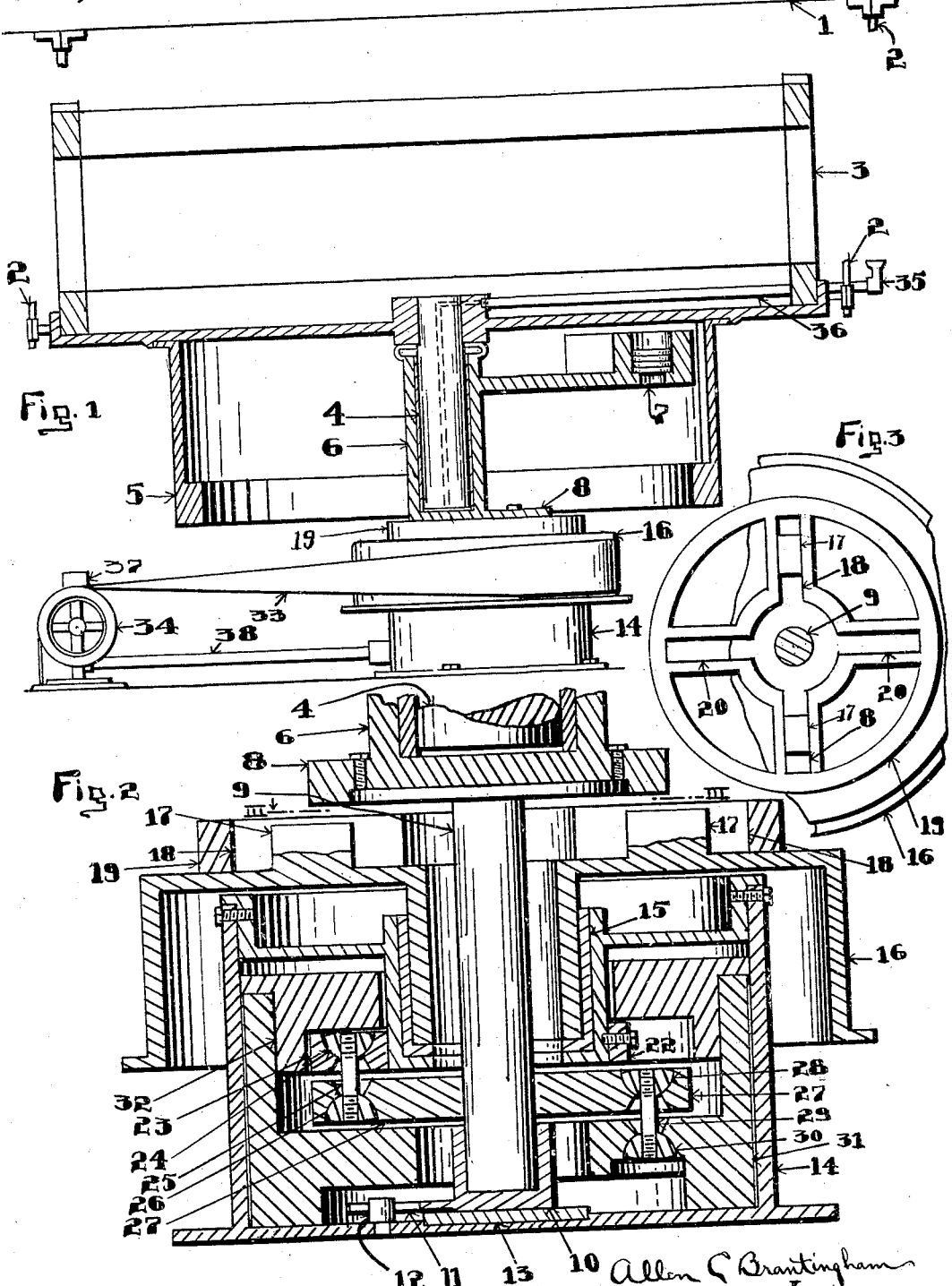

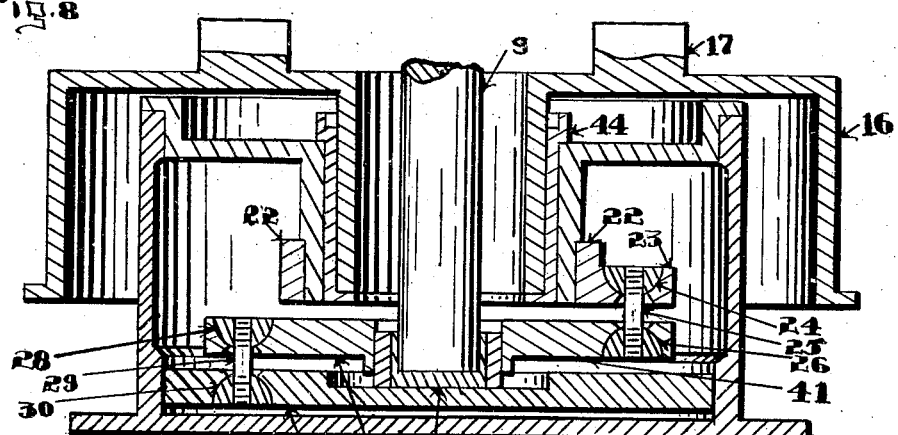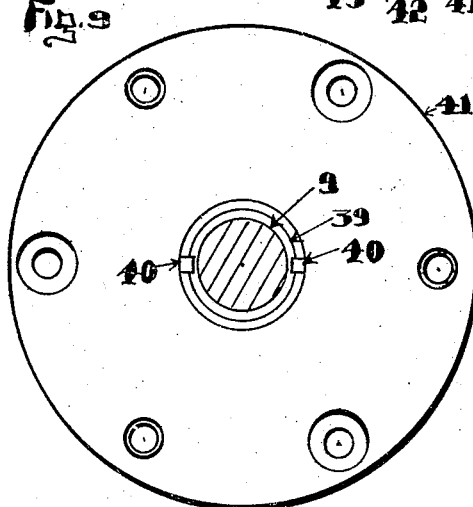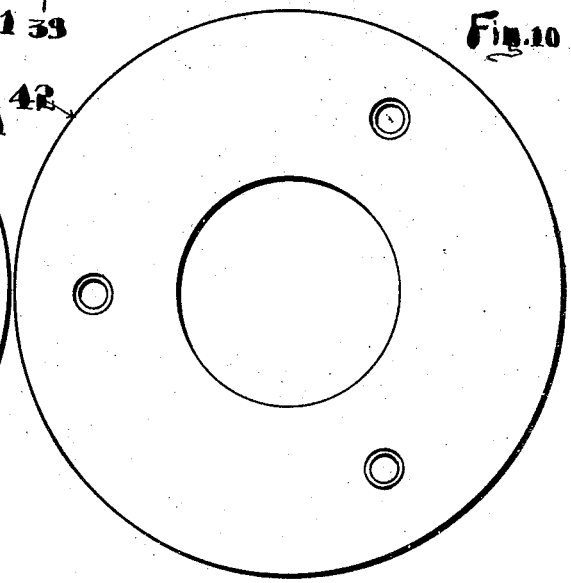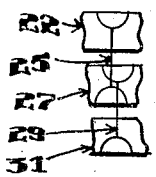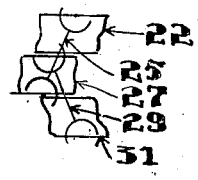

UNITED STATES PATENT OFFICE.

ALLEN C. BRANTINGHAM, OF TOLEDO, OHIO.

SIFTER-CONTROL DEVICE.

946,716.   Specification of Letters Patent.   Patented Jan. 18, 1910.

Application filed November 20, 1907. Serial No. 402,958.

*To all whom it may concern:*

Be it known that I, ALLEN C. BRANTINGHAM, a citizen of the United States, residing at Toledo, Lucas county, Ohio, have invented a new and useful Sifter-Control Device, of which the following is a specification.

This invention relates to control of an orbitally movable member.

This invention has utility when embodied in a gyratory sifter, with which it effectively coacts to confine the movements to that of normal travel and steadying the mechanism to approximate such normal travel or throw.

Referring to the drawings: Figure 1 is a vertical section of a sifter and gyrator of the low-box self-balancing type, the driving and control devices being shown in side elevation, the latter being an embodiment of the invention herein; Fig. 2 is a vertical section of the control device at right angles to the showing in Fig. 1, said section being medially of control device and medially of gyrator; Fig. 3 is a plan of the driving transmission on line III—III, Fig. 2, with lugs on gyrator removed; Fig. 4 is a vertical section similar to that of Fig. 2, but with parts rotated 180° therefrom and gyrator moved off center; Fig. 5 is a plan view of the fixed member of the control device; Fig. 6 is a plan view of the orbitally movable steadying member of the control device as herein embodied; Fig. 7 is a plan view of the weight carrying or reciprocable member of the control device; Fig. 8 is a vertical section, similar to that of Fig. 2, showing the control device adapted to be loaded by the gyrator in which respect as to the loading or weighting it differs from the showing in Figs. 2 and 4; Fig. 9 is a plan view of the steadying member of the control device shown in Fig. 8; Fig. 10 is a plan view of the weight carrying or reciprocable member of the control device shown in Fig. 8; Fig. 11 is a diagrammatic showing of the double linkage or toggle in position assumed in normal operation, one series only of the toggle links being illustrated; and Fig. 12 is a diagrammatic showing similar to Fig. 11, but illustrating lifting action transmitted to lower member by the links, due to eccentric or lateral movement of intermediate member.

From the fixed timber 1, by means of flexible rods 2, the box or body 3 is freely suspended so that it may have gyratory movement. Fixed in the container for the substance to be treated, or sifter box 3 is shaft or stem 4, while surrounding this stem and spaced therefrom is annular flange or weighted petticoat 5 weighted near its lower portion. Engaging the shaft 4 is the bearing sleeve 6 of the gyrator which is eccentrically weighted by an extension having pockets for weights 7. The weights 7 by being removable permit adjustment of the gyrator weight, which in its rotation travels within the petticoat 5. Integral with the sleeve 6 of the gyrator is an eccentrically disposed plate 8, having concentric therewith the shaft or stem 9 shown as bolted to the plate 8. While stem 9 is eccentric to bearing sleeve 6 of the gyrator, this stem 9 approximates the normal center of gyration of the sifter mechanism. Essentially the gyrator includes the orbitally traveling bearing 6, and in this instance further comprises the weighted extension having the pockets for the weights 7. This stem or shaft 9 (Figs. 2 and 4) is set in a cup shaped step bearing 10 serving as a sustainer for the gyrator which is provided with a forked lateral extension 11 engaging pin or stud 12, thus preventing rotation of step 10 while permitting the step to have some movement on plate 13 centrally disposed in the bottom of vessel 14. As shown, the stud 12 is attached to vessel 14. The vessel or frame 14 has lateral bearing 15 for driver or pulley 16. This pulley 16 is provided with a pair of diametrically disposed lugs 17, shown in partial section in Fig. 2 and in plan Fig. 3. These lugs 17 engage in ways 18 of transmission member 19, which member has other ways 20 engaged by diametrically arranged lugs 21 on plate 8, shown in partial section in Fig. 4.

The fixed member 22 of the control device for the sifter or box 3 is herein shown as mounted on the lower portion of bearing sleeve 15 by bolts, or set screws. This fixed member 22 of the control device is provided with a plurality of extensions or ears 23 which have openings therethrough and spherical seats for hemispherical heads 24 of links 25, which at their opposite ends have similar heads 26 seating in the orbitally movable steadying member 27 of the control device. This member 27 may have a bearing more or less loosely engaging the shaft 9. The member 27 has other bearing seats of spherical form to receive heads 28 of links 29 extending oppositely to links 25. The remote or lower ends of links 29 to those having heads 28 engaging plate 27, have heads 30 with bearing in reciprocable load or weight carrying member 31 of the control device. This linkage system of control as shown herein is nonrotatable. That the control may be effected by keeping plate 27 to hold stub shaft 9 centrally of frame 14, the reciprocable member 31 may be additionally loaded by some means to urge it to its downward limit of movement. Herein there is shown the movable weight 32 applied as a yielding device. Accordingly the shaft 9 may move from its central position, but in so doing it soon comes in contact with the plate 27, and further movement of the shaft 9, will of course take with it this plate 27, shown as embodying the knee joint of a toggle. In attaining eccentric travel, the shaft 9 thus moving plate 27, throws the links 25, 29 into relatively oblique positions, shortening the distance between the members 22 and 31, and as member 22 is fixed, lifting of member 31 results.

The driver or pulley 16 is actuated through the flexible driving means or belt 33 passing over guide pulleys 34 fixed and positively spaced from the axially stationary pulley 16.

By introduction of lubricant into oil cup 35 it is conducted to stub shaft 4 through duct 36. Frame 14 may be in the form of a vessel as shown and the control device submerged in a liquid as lubricant, the level of which may be maintained by introduction of oil in cup 37 in communication with vessel 14 by pipe 38.

In the adaptation of the control device shown in Fig. 8, the stem 9 is stepped in bearing cup 39 held by keys 40 from rotation as to orbitally movable steadying member 41 suspended by links 25 from fixed member 22 of the control device. Hung from member 41 by links 29 is reciprocable load carrying member 42. This member 42 is herein loaded with the rotary gyrator by having the cup 39 stepped thereon instead of being weighted itself or by a non-rotatable means 32 introduced as an additional element to the mechanism. To sustain the fixed member 22 of the control device, there is provided the frame or vessel 43, which has fixed central lateral bearing 44 for pulley 16.

Operation: The driving belt 33 rotating pulley 16 effects rotation of the gyrator through lugs 17, transmission plate 19 and lugs 21. The unbalanced weight of the gyrator will cause it to seek to have its center of rotation intermediate the weights 7 and sleeve 6 owing to the fact that there is the inertia of the box to overcome. In this design the center of rotation or gyration is approximately within the stem 9. Unbalancing as in starting and stopping, as well as box loaded either below or above normal, tends to shift the center of rotation of stem 9 and thus vary the amount of throw or travel of the sifter. To counteract this abnormal condition and insure uniform travel and steadying, thus avoiding lunges and consequent rack to the machine and its mounting, as well as effecting the substance treated, there is introduced a control device to limit and steady orbitally movable stem 9. This control device is of toggle design, the knee portion of which is the steadying member 27 or 41. The elements comprising the toggle include the links or rods 25 and 29, united by the hinge embodying plate 27 or 41. When the links are in parallelism, that is with the member 27 centrally positioned, the first movements of stem 9 off center in attempting to describe an orbit of travel, are resisted but little, as the links are at no angle or a very small angle to each other and relatively small force is necessary to move the knee 27 or 41 when in such a position. However, as eccentricity of shaft 9 increases, the resistance met is multiplied, for with the increasing relative angularity of links 25 to links 29, the lift of plate 31 or 42 is proportionally more and is handled at less mechanical advantage by a force acting on the knee plate. Herein the lift is doubled, the short links soon having their arcs develop the sharp upward turn, which, as there are two links in succession or series produces twofold action on reciprocable member 31 or 42. Member 27 or 41 is lifted, but as only by one set of links, its lift is less than that of the reciprocable member. The resistance to reciprocation is on member 31 or 42. The links are shown as three in multiple and two in series that is two successive sets of three links each. The interposed member 27 or 41 is centrally poised by the action of the links 25, 29, and it may accordingly float about in a small orbit with a slight reciprocation or lift movement. The off center travel of stem 9 throws the links 25, 29 into oblique relations to each other as shown in Fig. 4. The steadying member of the control device does not, even in the construction disclosed in Fig. 8, reciprocate in the same measure as the gyrator is lifted, while as shown in Fig. 2, the control is brought about by a system of links independently of the gyrator which may thus be sustained other than by the control device. Accordingly as to the step bearing or sustainer 10 the steadying member 27 is laterally movable. This construction permits of a most compact design of the greatest effectiveness, owing to the close range in which the linkage compels eccentric travel of the structure to encounter lift of the steadying device at quite an abrupt angle. It is not rigid to disastrously transmit vibration, but is capable of bringing about the center urging end or effect which it is desired to attain in a simple and most reliable manner. This center urging is due to gravity action of the mechanism when in off-center position, as the parts tend to force themselves to the lowest point, which is the normal central position.

What is claimed and it is desired to secure by Letters Patent is:

1. The combination with a sifter and a gyrator for the sifter, of steadying means having links coacting to produce a toggle action.

2. The combination with a sifter and a gyrator for the sifter, of a steadying means including a multiple series of links.

3. The combination with a body mounted for gyration, of a controller coacting therewith including a floating member and links engaging the member from above and below.

4. The combination with a gyratory body, of a controller therefor including a link carried member, link means engaging the member, and non-rotatable load-carrying means movably connected by the link means to the member.

5. The combination with a sifter, of a controller therefor including parallel links movable to relatively oblique positions and means to urge said links into parallelism.

6. The combination with a body mounted for gyration, of a controller coacting therewith including a movably carried member and loading means reciprocable relatively to the member.

7. A container for the substance to be treated, and a gyrator for the container, in combination with a link control device having means engaging the gyrator, said means reciprocable relatively to the gyrator.

8. A container for the substance to be treated having an abnormally laterally movable gyrator, and a step bearing directly mounting the gyrator, in combination with a control device independent of the step bearing, said device including a steadying member for the gyrator movable relatively to the step bearing to yieldingly direct the gyrator to approximate normal travel.

9. The combination with a sifter of a control device therefor including a fixed member, a reciprocable member, a sifter actuated member movable relatively to the reciprocable member, and connections between the members causing movement of the sifter actuated member to actuate the reciprocable member.

10. A container for the substance to be treated and a gravity control device coacting therewith having an orbitally movable steadying member and a relatively reciprocable weight carrying member.

11. A self balancing gyratory mechanism and a control device coacting therewith including an eccentrically movable steadying member and a relatively movable non-rotatable weight carrying member connected to urge the steadying member to a central position.

12. The combination with a container for the substance to be treated and a gyrator for the container, of a coacting control device having an orbitally movable steadying member, said member being reciprocable relatively to the gyrator.

In witness whereof I affix my signature in the presence of two witnesses.

ALLEN C. BRANTINGHAM.

Witnesses:
   Geo. E. Kirk,
   C. H. Rauch.